Figure 3:
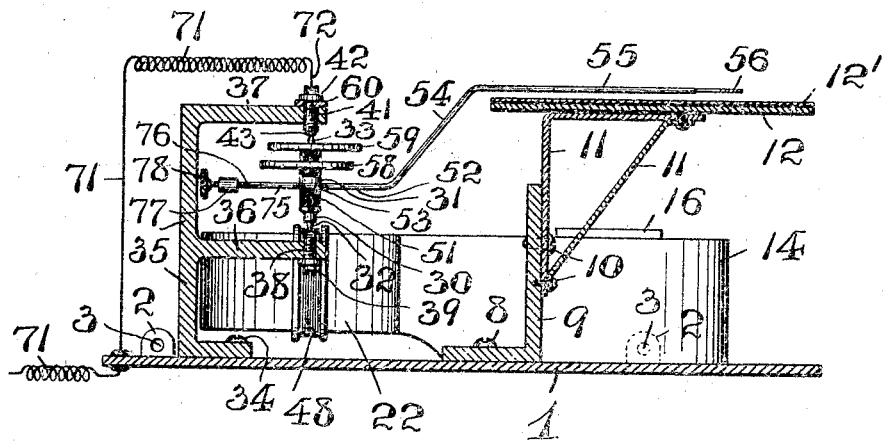

J. L. ZANDER.
ELECTRICAL MEASURING INSTRUMENT.
APPLICATION FILED MAY 21, 1909.
958,792.
Patented May 24, 1910.
3 SHEETS—SHEET 1.
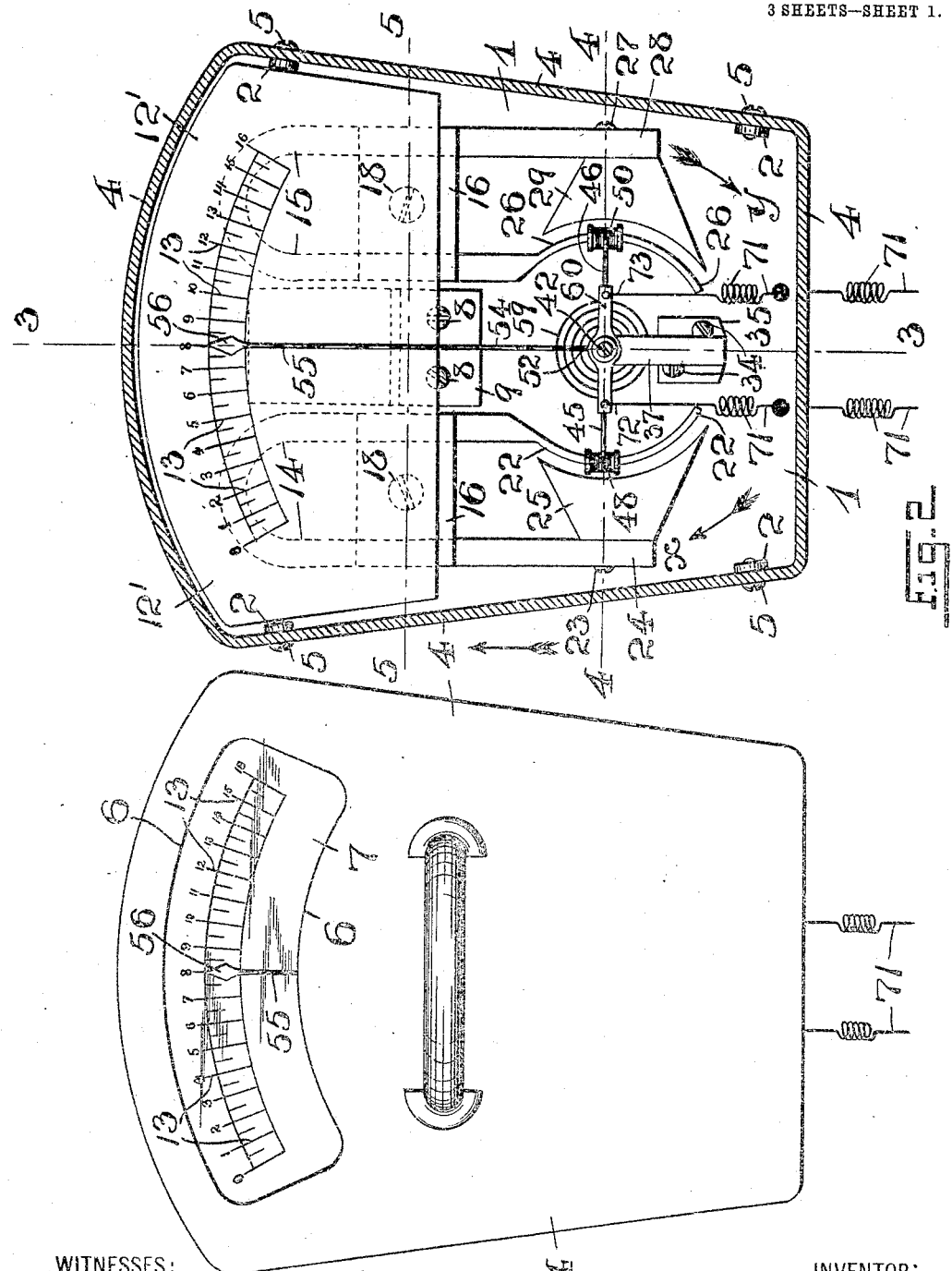
WITNESSES:
Fredk H. W. Fraentzel
Anna H. Alter
INVENTOR:
John L. Zander,
BY
Fraentzel and Richards,
ATTORNEYS

J. L. ZANDER.
ELECTRICAL MEASURING INSTRUMENT.
APPLICATION FILED MAY 21, 1909.

958,792.

Patented May 24, 1910.
3 SHEETS—SHEET 2.

WITNESSES:
Fredk H. W. Fraentzel
Anna H. Alte

INVENTOR:
John L. Zander,
BY
Fraentzel and Richards,
ATTORNEYS

J. L. ZANDER.
ELECTRICAL MEASURING INSTRUMENT.
APPLICATION FILED MAY 21, 1906.
958,792.
Patented May 24, 1910.
3 SHEETS—SHEET 3.
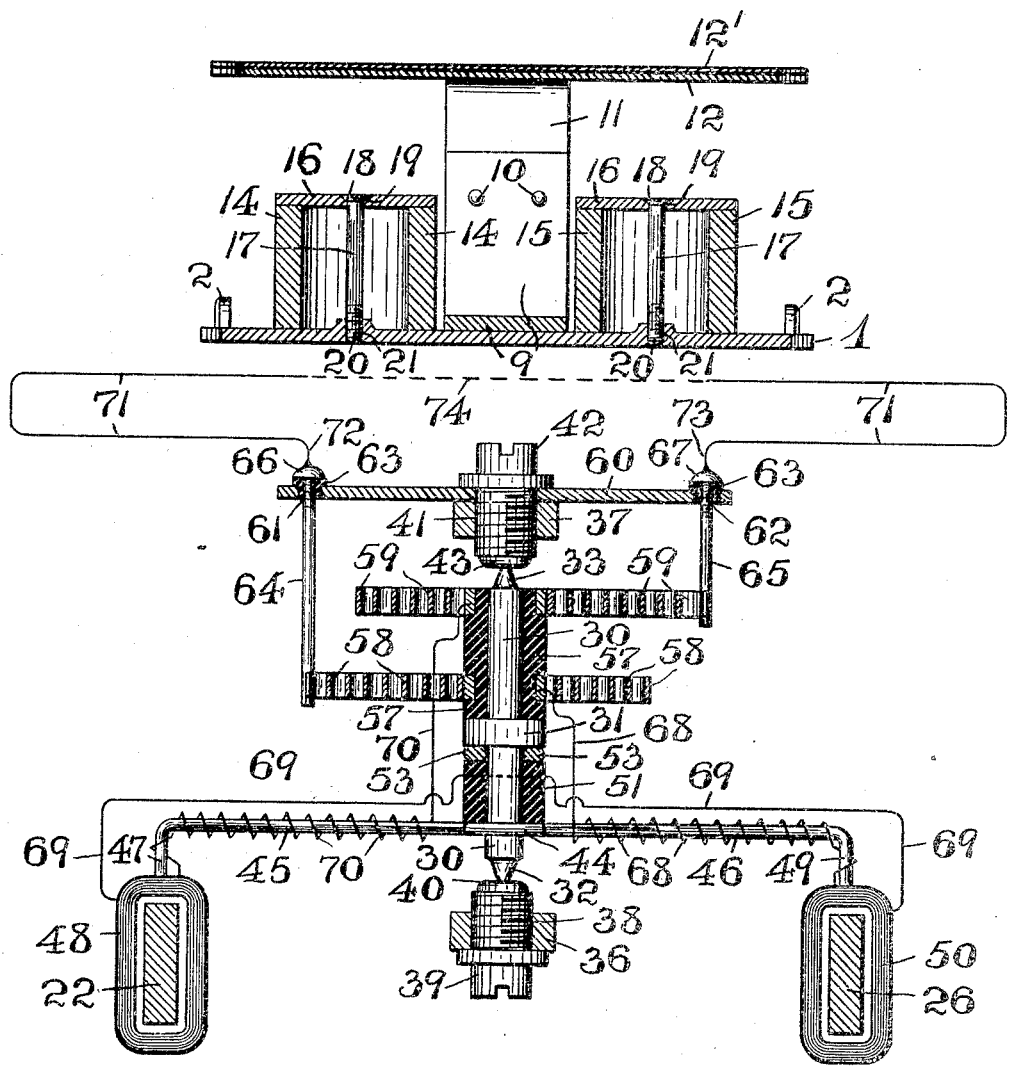
WITNESSES:
Fredk. C. W. Fraentzel
Anna H. Alter
INVENTOR:
John L. Zander,
BY
Fraentzel and Richards,
ATTORNEYS

UNITED STATES PATENT OFFICE.

JOHN L. ZANDER, OF NEWARK, NEW JERSEY.

ELECTRICAL MEASURING INSTRUMENT.

958,792.  Specification of Letters Patent.  Patented May 24, 1910.

Application filed May 21, 1909. Serial No. 497,419.

*To all whom it may concern:*

Be it known that I, JOHN L. ZANDER, a citizen of the United States, residing at Newark, in the county of Essex and State of New Jersey, have invented certain new and useful Improvements in Electrical Measuring Instruments; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in electrical heat-measuring devices; and, the present invention has reference, more particularly, to a novel and portable electrical measuring instrument for heat-measurements comprising a pair of magnets, and an energizing wire-wound coil movably arranged upon a pole-piece or member of each magnet, the coils or armatures being supported from an oscillatory arm, carried by a spring-controlled spindle or stem which is suitably mounted between suitable jewel-bearings, said springs and the coils being adapted to be placed in circuit with a thermo-electric couple for measuring or indicating various degrees of temperature, and an index-hand being secured to said spindle so as to move with the same and indicate the degrees of heat upon a dial or scale, as will hereinafter more fully appear.

My present invention has for its principal object to provide a novel and simply constructed and portable electrical measuring device for heat-measurements in which the various devices are arranged in a compact manner, the parts are reduced to a minimum, and in which the energizing coils while moving in the fields of the magnets have a large leverage with relation to their pivotal support, that is the spring-controlled spindle, so that the least movement of the coils will cause a correspondingly increased movement of the index-hand or indicator, so as to designate the degrees of heat upon a scale and to render the same readily readable.

Other objects of this invention not at this time more particularly enumerated will be clearly understood from the following detailed description of the same.

With the various objects of my present invention in view, the said invention consists, primarily, in the novel electrical measuring instrument hereinafter set forth; and, the invention consists, furthermore, in the novel arrangements and combination of the various devices and parts, all of which will be hereinafter more fully described and then finally embodied in the clauses of the claims which are appended to and which form an essential part of this specification.

The invention is clearly illustrated in the accompanying drawings, in which:—

Figure 4:
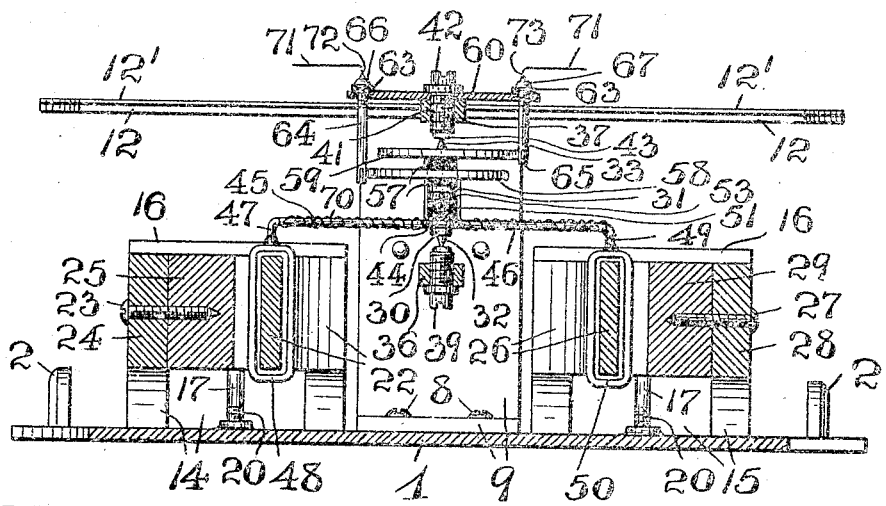

Figure 1 is a plan view of a portable electrical measuring instrument embodying the principles of the present invention; and Fig. 2 is a horizontal sectional representation of the inclosing body or case of the apparatus, the mechanism within said case being represented in plan or top view. Fig. 3 is a transverse section of the device, said section being taken on line 3—3 in said Fig. 2, with the top-element or cover of the device omitted from said view; Fig. 4 is a cross-section taken on line 4—4 in said Fig. 2; and Fig. 5 is a similar section taken on line 5—5 in the same figure. Fig. 6 is a detail view, partly in transverse section and partly in elevation, made on a larger scale, of one of the pole-pieces each of a pair of magnets, an energizing coil movably arranged upon each pole-piece, the spring-controlled spindle, the bearings in which the ends of said spindle are pivotally mounted, and the supporting lever carried by said spindle and from each free end of which is supported an energizing coil, said view showing also in connection therewith, the leading-out wires of a circuit in which may be arranged a thermo-electric couple, a portion of this circuit in which this couple, not here shown, is to be arranged being indicated by a dotted line-portion.

Similar characters of reference are employed in all of the above described views, to indicate corresponding parts.

Referring now to the said drawings, the reference-character 1 indicates a suitable base, which may be of any marginal configuration, and may be provided at suitable points near said edge with upwardly extending lugs or ears 2, said lugs or ears being formed with screw-threaded holes 3. Suitably arranged upon the said base 1 is a cover, as 4, the sides of which register with the said lugs or ears, substantially as shown in Fig. 2 of the drawings, and being suitably secured thereto by means of screws 5. The said cover 4 is formed in its upper face, at a desirable point, with a suitably formed reading-opening 6, back of which is a glass, as 7, suitably secured to the inner side of said upper face of the cover. The said upper face of the cover may also be provided with a suitable handle 4' for handling and carrying about the box or case which is formed when the said cover 4 is secured to the base 1. Suitably secured upon said base, by means of screws 8, or any other suitable fastening devices, is a standard or post-like-element 9, to which is attached, by means of screws 10, or other suitable fastening devices, a suitably formed bracket, as 11, upon which is mounted a plate 12. This plate is located below the said reading-opening 6 herein-above mentioned, and carries a member or element 12¹ which is suitably secured upon the upper face of the said plate 12, and has a scale or other suitable divisions or graduations 13 formed thereon, as clearly represented in the several figures of the drawings. Located upon opposite sides of the said standard or post-like element 9 are a pair of horse-shoe magnets 14 and 15, each magnet being firmly secured in its operative position upon the said base 1 by means of a perforated plate 16, and the screw 17, which has its screw-head 18 arranged in the correspondingly formed hole 19 in the plate 16, and has its screw-threaded portion 20 screwed into a screw-threaded hole 21 in the base 1, in the manner clearly indicated in Fig. 5 of the drawings. The horse-shoe magnet 14 is made with a suitably curved or arc-shaped end-member 22, forming one of the poles of the said magnet; and suitably secured by means of screws 23, or other suitable fastening means, to the straight end-member 24 of said magnet is a block, as 25, which is formed with a concave surface conforming to the convexed part of the end-member 22, substantially as shown, and the said block forming the other pole of the said magnet 14. In a like manner, the other horse-shoe magnet 15 is made with a suitably curved or arc-shaped end-member 26, forming one of the poles of said magnet; and suitably secured by means of screws 27, or other suitable fastening means, to the straight end-member 28 of said magnets, is a block, as 29, which is formed with a concave surface conforming to the convexed part of the end-member 26, substantially as shown, and the said block 29 forming the other pole of the said magnet 15.

As shown in Fig. 2 of the drawings, the two horse-shoe magnets 14 and 15 are secured upon the base 1 in such a manner, so that the concave surface-portions of the two end-members 22 and 26 will be opposite each other, as clearly shown, and form the arcs of a circle the center of which is in the longitudinal central axis of a vertical spindle 30. This spindle, as will be seen more particularly from an inspection of Fig. 6 of the drawings, is provided with an annular shoulder or flange 31 and is made with the pointed pivots or end-portions 32 and 33. Suitably secured upon the said base 1, by means of screws 34, or other suitable fastening devices, is a post-like member or standard 35 which is provided with rearwardly extending arms 36 and 37. The said arm 36 is formed with a screw-threaded hole 38 in which is adjustably arranged a screw-threaded bearing-plug 39 provided in its end-portion with a jewel-bearing 40. In a like manner, the said arm 37 is formed with a screw-threaded hole 41 in which is adjustably arranged a screw-threaded bearing-plug 42 provided in its end-portion with a jewel-bearing 43. As shown, the pointed pivots or end-portions 32 and 33 of the spindle 30 are mounted between the said jewel-bearings 40 and 43, so that the spindle 30 and the parts connected therewith will have a free oscillatory movement, as will be clearly evident. Suitably secured upon said spindle 30, so as to oscillate with said spindle, is an eye-portion 44, and extending from the opposite edge-portions of the same are suitable carriers or arms 45 and 46. Extending downwardly from the free end of the arm 45 is an extension 47 which carries a suitable wire-wound energizing coil 48, and likewise extending downwardly from the free end of the arm 46 is an extension 49 which carries a suitable wire-wound energizing coil 50. As shown, the coil 48 encompasses and is movably mounted upon the curved or arc-shaped member 22 of the magnet 14, and the coil 50 encompasses and is movably mounted upon the curved or arc-shaped member 26 of the magnet 15.

Suitably arranged upon the spindle 30 is a fixed sleeve or collar 51 of a suitable non-conducting material, and fixed to said spindle 30, between the end of said sleeve or collar 51 and the annular flange or shoulder 31 is the eye-portion 53 of a suitably formed index-hand 52. The hand is made with a suitably bent part 54 terminating in a finger 55 which is movably arranged above the previously mentioned plate 12 and the member 12¹, being provided with a pointer 56 which moves directly over the divisions or graduations 13 of the scale. Suitably fixed upon that portion of the spindle 30 directly above the annular flange 31 is a sleeve 57, also of a non-conducting insulating material, substantially as illustrated in the several figures of the drawings. Connected with and suitably secured at their inner ends to said sleeve 57, are a pair of torsional or spiral springs 58 and 59.

A plate or bar 60 is secured upon the upper arm 37 of the standard 35 by means of the previously mentioned screw 39, the said plate or bar 60 being provided in its respective end-portions with suitable holes or perforations 61 and 62. Suitably secured in said holes or perforations, and insulated from the plate or bar 60 by means of insulating sleeves 63, are downwardly extending rods or stems 64 and 65. The said stem 64 is provided with a suitable head 66 and a portion of its shank is suitably connected with the outer end-portion of the spring 58; and the stem 65 is also provided with a suitable head 67 and a portion of its shank is suitably connected with the outer end-portion of the spring 59. Connected with and extending from a portion of the spring 58 is a suitably covered or insulated circuit-wire 68, a portion of which may be wound around the arm 46 and extension 49, being connected with the magnetic coil 50. Connected with and extending from said coil 50 is a suitably covered or insulated circuit-wire 69, which may be wound around said arms 46 and 45 and is connected with the other magnetic coil 48. Connected with and extending from said coil 48 is a suitably covered or insulated circuit-wire 70, a portion of which may be wound about the extension 47 and said arm 45, and has its end suitably secured to a portion of the spring 59.

Suitably connected with the head 66 of the stem 64 is an end 72 of a main circuit 71, and connected with the head 67 of the stem 65 is the end 73 of the same wire 71, the dotted portion 74 of said wire indicating that part of the main circuit in which a thermo-electric couple is adapted to be located. That the said hand 52 may be properly balanced, the eye-portion 53 has extending therefrom, as represented in Fig. 3 of the drawings, an arm 75 which is provided with a screw-thread 76, upon which are movably and adjustably arranged a suitable counterbalance, as 77, and a lock-nut 78, the operation and purposes of which will be clearly evident.

Having thus in a general way described the construction of an electrical heat-measuring device showing one embodiment of the principles of my present invention, I will now briefly set forth its operation.

Under normal initial conditions, when the apparatus is not in use, the various parts are in such relative positions, at rest, so that the pointer of the index-hand will lie directly over the zero-graduation. As soon, however, as the pyrometer is put in circuit by connecting the ends of the wires 71 to a thermo-electric couple, or for that matter with an electricity-producing source, a complete electric circuit will be established through the main circuit 71, the stem 64, the spring 58, the wire 68, the coil 50, the wire 69, the coil 48, the wire 70, the spring 59, and the stem 65, back through the circuit 71 to the generating source. The result is that the coils 48 and 50 become energized, and that the said coils will move in opposite directions upon the respective end-members 22 and 26 of the horse-shoe magnets 14 and 15, in the directions of the arrows $x$ and $y$ in Fig. 2 of the drawings. In consequence thereof, the arms 45 and 46 will produce an oscillation of the spindle 30 between its bearings, and the pointer of the index-hand will accordingly move along the scale for proper indication, as will be understood. As soon as the current-producing source has again been cut out of the main circuit 71, the previously wound springs 58 and 59 will mechanically assume their normal positions and will thereby return the movable parts of the instrument to their normal positions with the pointer of the index-hand again at zero.

I am aware that some changes may be made in the arrangements and combinations of the various devices and parts, without departing from the scope of this invention as described in the foregoing specification and as defined in the appended claims. Hence I do not limit my present invention to the exact arrangements and combinations of the devices and parts as set forth in the said specification, nor do I confine myself to the exact details of the construction of the said parts as illustrated in the accompanying drawings.

I claim:—

1. In an electrical measuring instrument, a pair of magnets, each magnet being formed with a straight pole-member and an arc-shaped pole-member, a block upon each straight pole-member, said block extending toward the arc-shaped pole-member and having a concave surface in close proximity to the convex surface of the arc-shaped pole-member, and a wire-wound coil encircling an arc-shaped pole-member of each magnet and moving upon said pole-members.

2. In an electrical measuring instrument, a pair of horse-shoe magnets, each magnet being formed with a straight pole-member and an arc-shaped pole-member, said arc-shaped pole-members being of like polarity, a block upon each straight pole-member, said block extending toward the arc-shaped pole-member and having a concave surface in close proximity to the convex surface of the arc-shaped pole-member, a spindle placed between said arc-shaped pole-members, a support connected with and extending from said spindle, and wire-wound coils carried by said support, each coil encircling an arc-shaped pole-member and moving thereon.

3. In an electrical measuring instrument, a pair of horse-shoe magnets, each magnet being formed with an arc-shaped pole-member, a spindle placed between said arc-shaped pole-members, a supporting rod mounted upon said spindle, a wire-wound coil suspended from each end of said rod, each coil encircling an arc-shaped pole-member and being movably arranged thereon, a sleeve of non-conducting material mounted upon said spindle, a pair of spiral springs upon said sleeve, an electric circuit-wire connecting each spring with a coil, and a connecting circuit-wire between said coils.

In testimony that I claim the invention set forth above I have hereunto set my hand this 18th day of May 1909.

JOHN L. ZANDER

Witnesses:
   FRED'K H. W. FRAENTZEL,
   FRED'K C. FRAENTZEL.